United States Patent

[11] 3,608,768

| | | |
|---|---|---|
| [72] | Inventor | Raymund V. McGrath<br>Palos Heights, Ill. |
| [21] | Appl. No. | 7,101 |
| [22] | Filed | Jan. 30, 1970 |
| [45] | Patented | Sept. 28, 1971 |
| [73] | Assignee | Chicago Bridge & Iron Company<br>Oak Brook, Ill. |

[54] MULTIPLE-WALL LIQUID STORAGE TANK
11 Claims, 9 Drawing Figs.

[52] U.S. Cl. .................................................... 220/10,
   220/13
[51] Int. Cl. .................................................... B65d 7/22
[50] Field of Search ........................................ 220/10, 13;
   137/434; 62/45, 55

[56] References Cited
UNITED STATES PATENTS

| | | | |
|---|---|---|---|
| 1,285,383 | 11/1918 | Van Rensselaer ........... | 220/13 |
| 2,389,246 | 11/1945 | Davey ........................ | 220/10 |
| 2,955,723 | 10/1960 | McGrath ..................... | 220/10 X |
| 3,353,552 | 11/1967 | Rowley ....................... | 137/434 |
| 3,438,215 | 4/1969 | Frijlink ........................ | 62/45 |

*Primary Examiner*—Lloyd L. King
*Attorney*—Merriam, Marshall, Shapiro & Klose

ABSTRACT: A vessel for storing liquids having walls forming an outer annular chamber adjacent walls of an inner tank and surrounding the lower peripheral portion of the tank, the chamber having an outer wall with the inner sidewall thereof and a portion of the tank walls being common, a liquid passage connecting the annular chamber and the inner tank, a pipe positioned in the inner tank communicating at its lower end with the liquid passage, and means to buoyantly support the pipe so that its upper end is below or at about the level of liquid in the inner tank to transfer liquid through the pipe between the inner tank and annular chamber when the liquid level is at or below a maximum level in the annular chamber during filling or emptying of the vessel, and to support the upper end of the pipe above the liquid level in the inner tank when the liquid level in the annular chamber reaches or is at the maximum level.

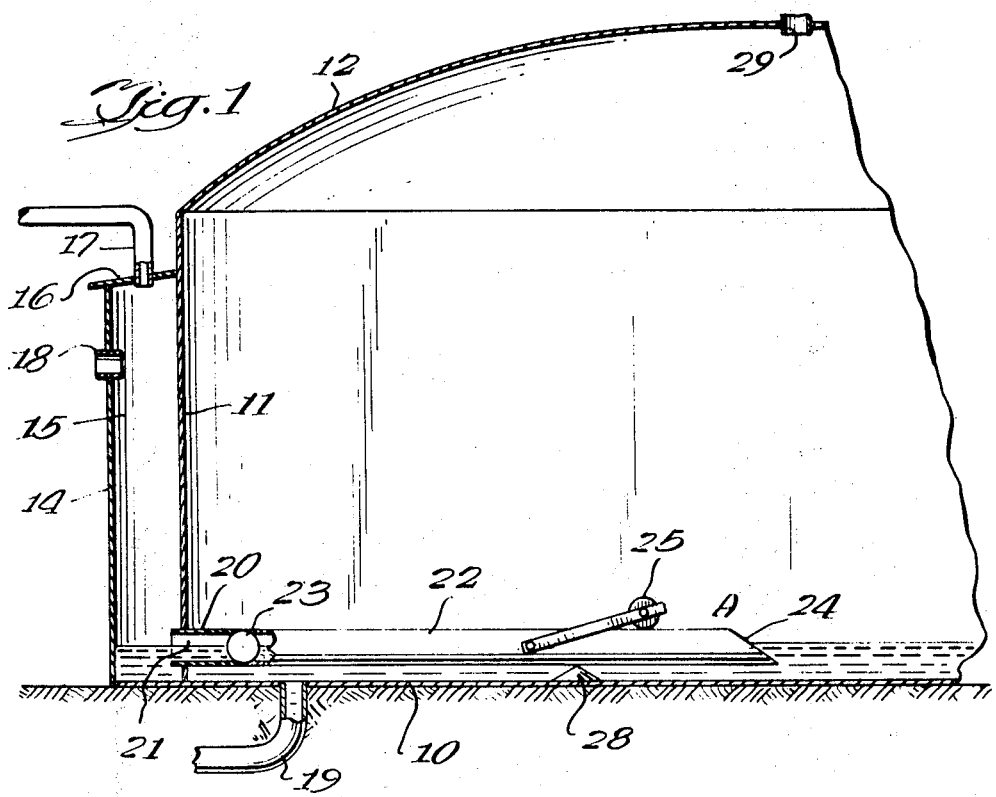
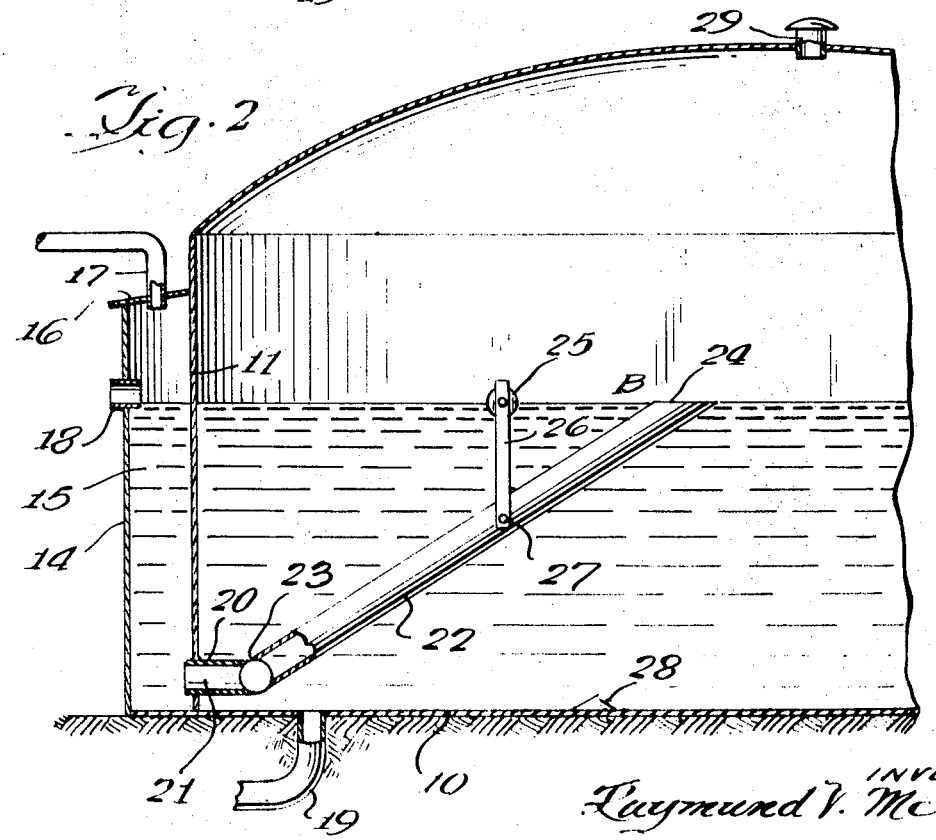

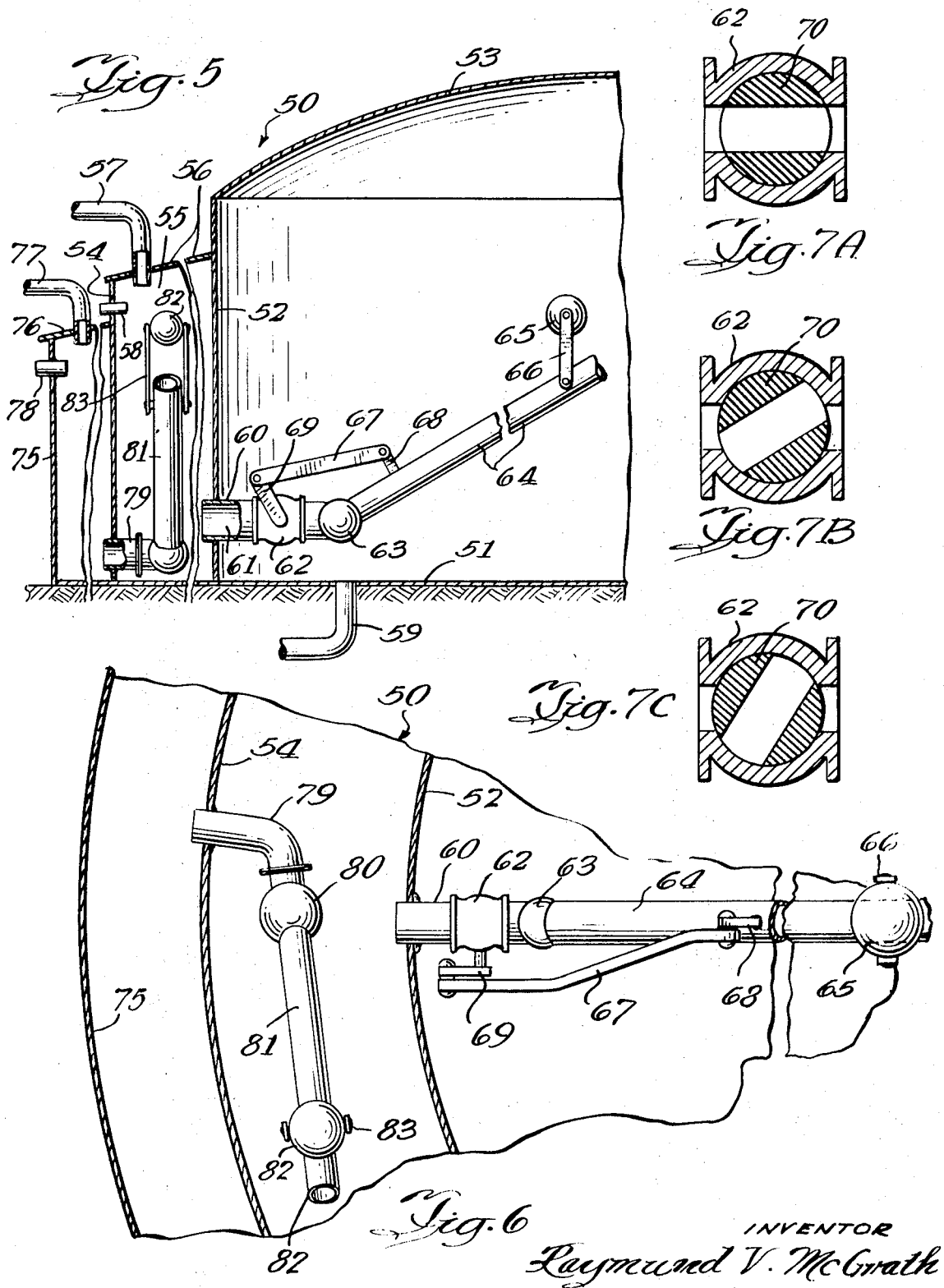

MULTIPLE-WALL LIQUID STORAGE TANK

This invention relates to a storage tanks or vessels. More particularly, this invention is concerned with novel tanks or vessels for storing liquids in large volume.

Vessels or storage tanks for liquids are conventionally made of metal plates and usually must be constructed to meet industry or national standards. These often limit the thickness and tensile strength of the metal plate which can be used. The required thickness for the plates in tanks or vessels storing liquid increases with the hydrostatic load applied thereto and with the size of the tank or vessel. With the thickness of the plates limited to 1½by some standards and to 2 inches by others, the maximum size of tanks and vessels built under industry or national standards is thus established. Tanks larger than these established maximums are necessary, and are being constructed in thicknesses greater than 1 ½inch, or outside of the standard usually governing such vessels. The greater thickness is generally not considered good practice in these large tanks which are not practicable to be post weld heat treated. Thicker plates have a reduced notch toughness in addition to greater difficulty in forming the plates, in reinforcing the openings, and in handling the heavier plates. The petroleum industry tank standard limits shell plate thicknesses to 1½ inch but larger tanks than permitted by this thickness are being required by many petroleum companies.

It has previously been proposed to produce storage tanks and vessels by using at least one additional wall around the primary or inner shell wall of the vessel, and to pressurize the resulting annular space with liquid or gas in order to at least partially counterbalance the forces exerted against the inner shell when the vessel or tank contains a liquid. When an outer shell is used and a counterbalancing pressure is exerted against the outer face of the inner shell, it is feasible to fabricate the inner shell of thinner plates than would otherwise be required. See for example my U.S. Pat. No. 2,955,723, issued Oct. 11, 1960, directed to a double-wall pressure vessel. Although the concept of using double or multiwall tanks or vessels is sound, there has been present the problem of regulating the pressure exerted in the annular space surrounding the inner wall. Such a system must be essentially foolproof for safety and to avoid loss of valuable or hazardous materials stored in such vessels or tanks.

Walter A. Rowley, in U.S. Pat. No. 3,353,552, issued Nov. 21, 1967, proposed apparatus to provide a balanced control of liquid between the inner shell and the outer shell or annular space surrounding the inner shell to thereby effect a counteracting or balancing pressure against the inner shell wall so as to permit construction of the inner shell wall of thinner plates than would otherwise be possible. The system of Rowley is considered to perform the desired function. However, it is believed that a more simple system would find ready acceptance and involve less capital expenditure.

According to the present invention, there is provided a novel system for regulating the pressure between an inner and outer tank. More specifically, the invention provides a vessel, for the storage of a liquid material, which has an inner shell and an outer shell. The outer shell can be higher than or as high as the inner shell or of lesser height. The outer shell surrounds and is spaced outwardly from the inner shell. The inner shell defines an inner tank, and the outer shell together with all or a portion of the inner shell defines an outer tank. The inner tank is capable of containing a stored liquid up to a first given maximum level and the outer tank is adapted to contain a liquid up to a second given maximum level which is lower than the first level. The height of the outer shell, therefore, must be slightly greater than the second given maximum level. Both the inner and outer shells are free to move independently of one another in response to the hydrostatic pressure of liquid in the inner and outer tanks. A liquid passage connects a lower space or portion of the inner tank with a lower space or portion of the outer tank so that liquid can flow between the tanks during filling or emptying thereof. A pipe is positioned in the inner tank to be pivotally or movably in communication at its lower end with the liquid passage. The pipe is buoyantly supported so its upper end is below or at about the level of liquid in the inner tank to transfer liquid through the pipe communicating with the inner and outer tanks when the liquid level in the inner tank is at or below the second given maximum level during filling or emptying of the vessel. Furthermore, the pipe is buoyantly supported so that the upper end of the pipe is raised above the liquid level in the inner tank when the liquid level in the outer tank reaches or is at the second given maximum level thereby permitting the level of stored liquid in the inner tank to rise until the maximum liquid storage capacity of the inner tank is reached without liquid simultaneously flowing to the outer tank.

In using the vessel of this invention, liquid to be stored is fed to the inner tank. As liquid is fed thereto, there is continuous flow of liquid through the buoyantly supported pipe to the outer tank so that the liquid level in the inner and outer tank is maintained essentially the same as the level rises in the filling operation. As the filling is continued, the pipe pivots or rotates from an essentially horizontal position through an angle until it is at an acute angle or arced if the pipe is made wholly or partially of a flexible material, such as rubber. The buoyancy means supporting the pipe is regulated so that, when the level of liquid in the outer tank reaches a predetermined maximum height, the upper end or mouth of the pipe is lifted by the buoyancy means above the level of the liquid in the inner tank and stays above such level as filling of the inner tank progresses until the tank is filled. When the tank is filled, the upper end or mouth of the pipe continues to project or be above the liquid level in the inner tank to thereby prevent draining or flow of liquid from the inner tank to the outer tank. As the tank is emptied, the reverse operation takes place. In emptying the tank, liquid is drained from the inner tank alone until the level in the inner tank drops to about the same height as the liquid level in the outer tank. At this point, the upper end or mouth of the pipe is about at or coincides with the liquid level. As emptying continues, the liquid level in both the inner tank and the outer tank are lowered simultaneously through transfer of liquid from the outer tank through the pipe to the inner tank. This state of liquid balance is maintained until emptying stops. It can, therefore, be readily seen that a balanced hydrostatic pressure is achieved through the liquid supplied to the outer tank during filling and maintained there in controlled amount during emptying. The resulting balanced pressure on the inner tank shell permits it to be constructed to withstand lower forces than it would have to bear in the absence of the counterbalancing pressure exerted thereon by liquid in the outer tank. The lower forces, or stresses, in the inner tank permit use of thinner shell plates.

The invention will now be described further in conjunction with the attached drawings in which:

FIG. 1 is a sectional elevational view of one embodiment of a vessel in accordance with the invention and shows a pivotal or movable pipe at its lowermost horizontal position with the vessel practically empty;

FIG. 2 is a sectional elevational view of the same vessel of FIG. 1 with the pivotable pipe shown in buoyant position with the liquid level in the outer tank at its maximum height;

FIG. 5 is a sectional elevational view of another embodiment of the invention and shows two outer tanks surrounding an inner tank with a movable pipe in the first outer tank for transferring liquid between it and the second or outermost tank;

FIG. 6 is a partial sectional plan view of the vessel of FIG. 5; and

FIGS. 7A to 7C illustrate positions of the plug valve shown in FIGS. 5 and 6 at different positions of the movable pipe.

So far as is practical, the same elements or members which appear in the various views of the drawing will be identified by the same number.

Figure 3:
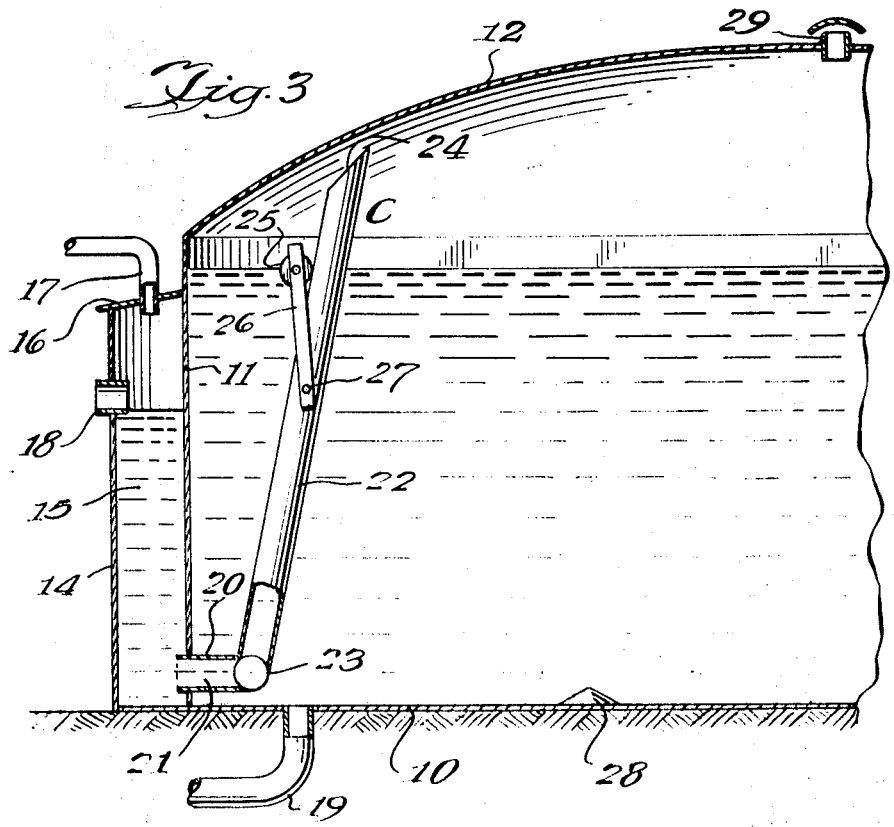
FIG. 3 is an elevational sectional view of the same vessel shown in FIGS. 1 and 2, but with the pivotable pipe shown in its most upright position with the inner tank filled to maximum liquid capacity.

With reference to FIGS. 1 to 3, which show the same vessel for storing liquid in different states of being filled, the vessel has an inner shell comprised of a metal bottom 10, inner sidewall 11 and roof 12 supported by the sidewall 11. The bottom 10, sidewall 11 and domed roof 12 together form an inner tank generally cylindrical in shape. The roof is not essential to the invention. If a roof is used, it can be domed or conical, be entirely supported by wall 11 or partially by wall 11 and partially by internal columns and rafters. Also, wall 11 can be completely open at the top and, if desired, a floating roof placed inside. Obviously, in tanks of spherical or elliptical shape, the bottom and sidewalls as well as the roof run together and can be described more clearly in such instances as a shell or inner shell without differentiating between the bottom, side and top thereof. The applicability of the subject invention to such various shaped vessels will be obvious to those skilled in this art since my earlier U.S. Pat. No. 2,955,723 shows a group of different-shaped double-walled vessels.

The vessel of FIGS. 1 to 3 has an outer shell wall 14 which rests on bottom 10. Outer wall 14 is cylindrical and between it and inner shell wall 11 an annular space 15 is defined. Walls 11 and 14 and bottom 10 therebetween form the outer tank. Top 16 spans the distance between inner and outer shell walls 11 and 14 to protect, if necessary, annular space 15 against the environment. Top 16 is not an essential part of the invention and can be left off if desired. One or more vents 17 can be provided in top 16 for vapor or air or other gases to escape during filling of the vessel to prevent pressure buildup therein and to permit the entry of air or other gas during emptying of the tank to avoid creation of a vacuum therein. Vent 29 is provided in roof 12 for similar reasons as regards the inner tank. As an alternate, both the roof 12 and the top 16 can be omitted, if desired.

Emergency overflow 18 positioned in outer shell wall 14 defines an opening to permit liquid to flow from the outer tank if an overflow condition accidentally develops therein. Overflow 18 is located so as to be slightly above the maximum level to which liquid normally is to be filled in space 15.

Tube 19, located to provide an opening through bottom 10, is used to fill and empty the inner tank with liquid. This tube can be positioned elsewhere if desired. For example, it can run directly through the lower part of shell walls 11 and 14.

Tubular section 20 is mounted in the lower portion of inner wall 11 and forms a liquid passage 21 connecting the lower space of the inner tank with the lower space of the outer tank so that liquid can flow between the tanks when the conditions are appropriate.

Pipe 22 has its lower end 23 pivotably connected to tubular section 20 to provide communication with liquid passage 21. The upper end or mouth 24 of pipe 22 is open. Float 25 is mounted on a pair of arms 26 mounted by pivots 27 to pipe 22. Support 28 is mounted on the inside surface of bottom 10 and supports pipe 22 when the inner tank is empty or contains insufficient liquid for float 25 to provide buoyant support to pipe 22.

When liquid is first supplied by tube or conduit 19 to the inner tank, pipe 22 is at position A as shown in FIG. 1. As the level of liquid in the inner tank rises, it causes float 25 to become buoyant. As float 25 moves upwardly with the liquid level, it causes pipe 22 to pivot upwardly due to its buoyancy. As pipe 22 moves upwardly, the upper end or mouth 24 is at or below the rising liquid level in the inner tank. As a result, liquid continuously flows through pipe 22, through liquid passage 21 and into outer space 15 so that the liquid level in both the inner tank and the outer tank rises essentially uniformly and at the same rate until the maximum liquid level is reached in the outer tank and pipe 22 reaches about position B in FIG. 2. At that point, further liquid supplied to the inner tank causes pivoting pipe 22 to move upwardly because of the buoyancy induced by float 25 and raises mouth 24 above the liquid level in the inner tank. This prevents further liquid from flowing through pipe 22 into the outer tank and thereby avoids a further rise above the maximum predetermined liquid level in the outer tank space 15. At this time, the hydrostatic pressure is resisted by the outer wall since the pressure on the inner wall is balanced.

As additional liquid is fed by inlet conduit 19, the liquid level in the inner tank continues to rise without any corresponding liquid level change in the outer tank. The liquid level in the inner tank is then raised until it reaches its maximum design level as shown in FIG. 3 with pipe 22 raised to position C. Liquid is then no longer fed by pipe 19 since the tank has reached maximum capacity. At this time, the pressure against the inner shell is determined by the height of the liquid in the inner tank above the outer tank liquid level.

When liquid is emptied from the vessel of FIGS. 1 to 3, the liquid level drops initially only in the inner tank until the liquid level therein reaches the same level as the liquid in the outer tank space 15. At that point, mouth 24 is pivoted to position B shown in FIG. 2. With further emptying, liquid is caused to flow by gravity from the outer tank through liquid passage 21 and pipe 22 to the inner tank so that the liquid level is maintained essentially the same in both the inner and outer tanks until such time as the tank is empty and pipe 22 reaches position A shown in FIG. 1.

Figure 4:
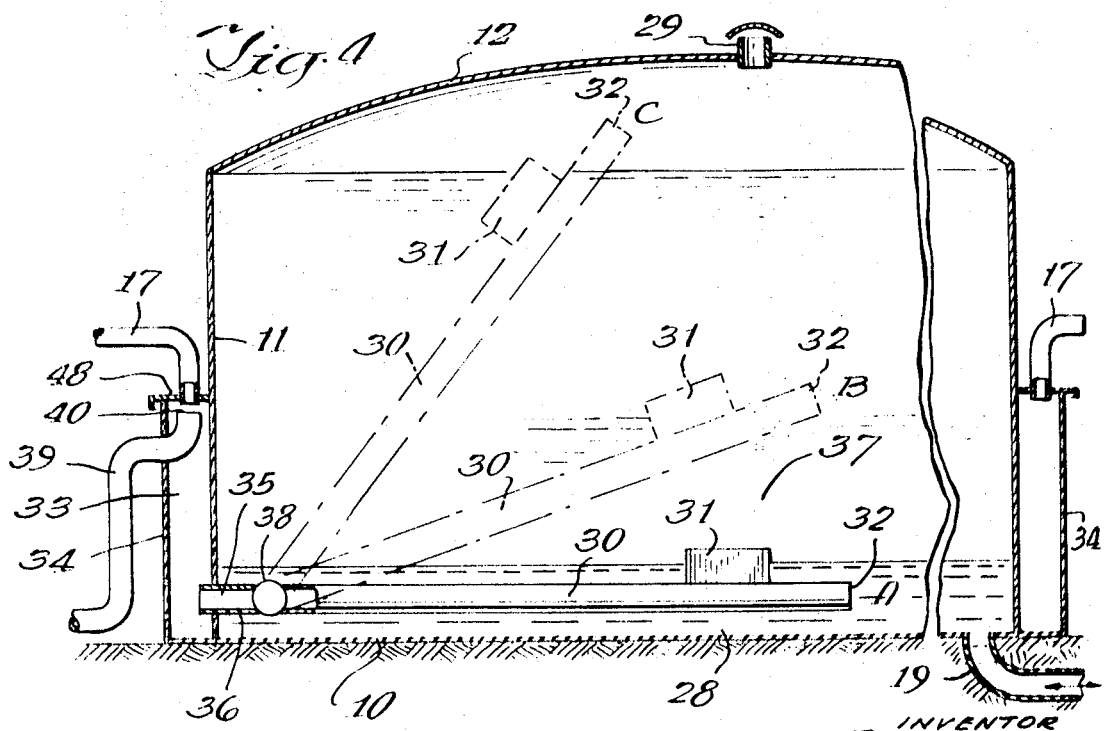
FIG. 4 is an elevational sectional view of another embodiment of a vessel according to the invention showing the pivotable pipe with another means for achieving buoyancy.

The vessel of FIG. 4 is generally quite similar to the one shown in FIGS. 1 to 3, except for the primary difference in the buoyancy means used for supporting pipe 30. A buoyancy chamber 31 is mounted in an adjustable manner on pipe 30 in a position such that the upper end 32 of the pipe will be raised above the maximum liquid level of the outer tank space 33 defined by inner shell wall 11, outer shell wall 34 and the portion of bottom 10 therebetween. Outer shell wall 34 is shown considerably less high than the comparable wall 14 of the vessel of FIGS. 1 to 3, but can be made any height as advisable based on engineering considerations and tank size. Liquid passage means 35 formed by conduit 36 provides means for liquid to flow back and forth between inner tank space 37 and outer tank space 33. Lower end 38 of pipe 30 communicates with conduit 36 to effect the desired fluid flow. Top 48 covers outer tank space 33 and has one or more vents 17 therein for the exit of vapor during filling and for the entry of air or other gas during emptying. Tube 39, having a mouth 40 slightly above the maximum liquid level of the outer tank, permits liquid to flow therefrom if an overfilled condition develops as for example through failure of pipe 30 to operate as designed.

The double-walled tank of FIG. 4 operates in the same manner as the tank of FIGS. 1 to 3. Pipe 30 of FIG. 4 is shown in three positions—A, B, and C. In position A, the tank is empty and hinged pipe 30 rests horizontally on support 28 on the tank bottom. As liquid is supplied by inlet 19 to the inner tank space 37, liquid fills the inner tank and also the outer tank space 33 by flowing through pipe 30 and passageway 35. Pipe 30 rises when the buoyancy chamber 31 floats on the liquid, and liquid continues to flow to the outer tank so long as the liquid surface is above the mouth or upper end 32 of pipe 30. When position B is reached, the inner tank is filled to the maximum liquid level designed for outer tank space 33. As additional liquid is fed to the inner tank, buoyancy chamber 31 raises the upper end 32 of pipe 30 to at or slightly above the liquid surface and thus prevents further liquid from entering pipe 30 and flowing to outer tank space 33. As additional liquid is supplied by inlet 19 to the inner tank 37, pipe 30 continues to rise until the maximum liquid level is reached in inner tank 37, at which point pipe 30 will be at position C. In emptying the tank, the reverse operations take place.

Although FIGS. 1 to 4 show only one hinged pipe in the inner tank, it is within the contemplation of this invention to use two or more such pipes as may be required to effect the transfer of liquid from the inner tank to the outer tank. In addition, the size of the hinged or pivotably mounted pipe can be such as to facilitate adequate liquid flow between the inner and outer tanks during filling or emptying. If advisable, the pipe can be made of a flexible tubular material such as of rubber or polyethylene. The entire pipe can be made of such material and the lower end attached directly to the end of pipe 20 or 35. When the upper end of the pipe is raised by the float, the pipe will move upwardly in the form of an arc or curve. An alternative structure that can be used comprises a flexible tubular portion connected to pipe 20 or 35 followed by a rigid pipe attached to the end of the flexible tubular portion.

The buoyancy chamber, regardless of the specific type used, can be adjustably mounted to compensate for differences in specific gravity of liquids and thus permit storage of different liquids in the tank with suitable operation of the system for achieving balanced pressure against at least the lower portion of the inner shell. The relative height of the inner and outer tank shells can be varied according to appropriate design calculations so as to permit use of a desired thickness of plate for the walls. Furthermore, instead of a double-walled tank, a multiplicity of outer shells can be employed and each annular space so defined provided with a pivotally mounted hinged pipe, which is meant to include a flexible pipe, and associated buoyancy means. Such a system will provide a means for utilizing thinner plate for the tank shells than required by single wall tanks and, therefore, the construction of exceedingly large storage tanks.

Although the tanks of FIGS. 1 to 4 show domed roofs, other forms of roofs, such as a cone roof, can be employed. In addition, the tank can be roofless or open to the atmosphere. Alternatively, a floating roof can be used to cover the liquid and a suitable chamber provided in the floating roof to receive the upper end of the pivotally mounted pipe when it is in its most upright position when the inner tank is filled.

Another embodiment of the invention is shown in FIGS. 5 to 7C. Vessel 50 of these figures has a metal bottom 51, inner sidewall 52 and roof 53 supported by sidewall 52. Bottom 51, sidewall 52 and roof 53 together form an inner tank generally cylindrical in shape. Vessel 50 also has a first outer shell wall 54 which rests on bottom 51. First outer wall 54 is cylindrical and between it and inner shell wall 52 an annular space 55 is defined. Walls 52 and 54 and bottom 51 therebetween form a first outer tank. Top 56 spans the distance between inner and first outer shell walls 52 and 54 to protect annular space 55 against the environment. One or more vents 57 are provided in top 56 for vapor or air or other gases to escape during filling of the vessel and to permit the entry of air or other gas during emptying of the tank to avoid creation of a vacuum therein.

Tubular section 58 positioned in wall 54 defines an opening to permit liquid to flow from the first outer tank if an overflow condition develops therein.

Tube 59 is used to fill and empty the inner tank with liquid.

Tubular section 60 is mounted in the lower portion of inner wall 52 and forms a liquid passage 61 connecting the lower space of the inner tank with the lower space of the first outer tank. Plug valve 62 is positioned in tubular section 60 which communicates with swivel joint 63 to pivotally movable pipe 64 having float 65 mounted thereon by brackets 66. Link 67 is mounted to stud 68 on pipe 64 and to lever arm 69 which actuates ball 70 in plug valve 62. Pipe 64 operates like pipe 22 previously described. However, as it moves up, it progressively moves ball 70 in the plug valve from the open position of FIG. 7A to a partially closed position as shown in FIG. 7B and then progressively to the closed position shown in FIG. 7C. The valve reaches the closed position when the liquid level in the first outer tank reaches a predetermined height. The valve thus serves to further control the rate of flow through the pipe, both in filling and emptying the tank, and gives a more sensitive operation than is obtained without the valve. The described valve and its operation can also be used in the embodiments of the invention shown in FIGS. 1 to 4.

Also, as shown in FIGS. 5 and 6, vessel 50 is provided with a second outer tank formed by second outer shell wall 75 which is spaced concentrically around and out from first outer shell wall 54. Walls 54 and 75 also rest on bottom 51. Top 76 covers the space between walls 54 and 75 and is provided with vent 77 and overflow pipe 78. Tubular section 79 is placed in the lower portion of wall 54 and constitutes a liquid passage between the first and second outer tanks. Swivel connection 80 is joined to tube 79 in the first outer tank and pipe 81 is joined to swivel 80. Float 82 is joined by brackets 83 to pipe 81. Pipe 81 moves up and down in the same manner as described with reference to pipe 22 and the purpose of the pipe is the same, i.e., to transfer liquid from the first outer tank to the second outer tank and to stop such flow when the liquid in the second outer tank reaches a predetermined liquid storage height determined for its stress limits, said height being less than the maximum liquid storage height in the first outer tank. By providing a second outer tank as illustrated, wall 54 can be made thinner or, without increasing the thickness, will permit a higher hydrostatic load or head in the first annular space 55. A higher hydrostatic head in the first annular space will enable inner wall 52 to be made thinner or, without increasing the inner wall thickness, will permit a higher hydrostatic load on inner wall 52. The higher hydrostatic load results in an increased capacity of liquid in the tank.

Although FIGS. 5 and 6 illustrate a vessel with two outer tanks, it is within the invention to use three or more outer tanks with pipe means as described for transferring liquid between them by controlled flow so as to prevent filling any outer tank above its predetermined liquid storage capacity.

The foregoing detailed description has been given for clearness of understanding only, and no unnecessary limitations should be understood therefrom, as modifications will be obvious to those skilled in the art.

What is claimed is:

1. A vessel for the storage of liquid material which comprises:
   walls forming an outer annular chamber adjacent walls of an inner tank and surrounding the peripheral portion of the tank in spaced relationship therewith,
   said chamber having an outer wall with the inner sidewall thereof and a portion of the tank walls being common,
   a liquid passage connecting the annular chamber and the inner tank,
   a pipe positioned in the inner tank communicating at its lower end with the liquid passage, and
   means to buoyantly support and displace the pipe so that its upper end is below or at about the level of liquid in the inner tank so as to transfer liquid through the pipe between the inner tank and annular chamber when the liquid level is at or below a maximum level in the annular chamber during filling or emptying of the vessel, and to support the upper end of the pipe above the liquid level in the inner tank when the liquid level in the annular chamber reaches or is at the maximum level.

2. A vessel according to claim 1 in which the vertical height of said chamber is less than the vertical height of the walls of said tank.

3. A vessel according to claim 1 in which the means to buoyantly support the pipe comprises a hollow float mounted on the pipe.

4. A vessel according to claim 3 in which the float is mounted in spaced relationship from the pipe by connecting means.

5. A vessel for the storage of liquid material which comprises:
   an inner shell wall,
   an outer shell wall which surrounds and is spaced outwardly from the inner shell wall,
   a bottom to which the inner and outer shell walls are connected at their lower ends, the inner shell wall with the bottom defining an inner tank for containing liquid up to a first given maximum level,
   the lower part of the inner shell wall with the bottom and the outer shell wall defining an outer tank adapted to contain liquid up to a second given maximum level which is lower than the first level, the inner and outer shell walls being free to move independently of one another in response to the hydrostatic pressure of liquid in said inner and outer tanks,
a liquid passage connecting a lower space of the inner tank with a lower space of the outer tank,
a pipe positioned in the inner tank communicating at its lower end with the liquid passage, and
means to buoyantly support and displace the pipe so that its upper end is below or at about the level of liquid in the tank so as to transfer liquid through the pipe between the inner and outer tanks when the liquid level is at or below the second given maximum level during filling or emptying of the vessel, and to support the upper end of the pipe above the liquid level in the inner tank when the liquid level in the outer tank reaches or is at the second given maximum level.

6. A vessel according to claim 5 in which the outer shell wall is of lesser height than, and is spaced outwardly from the lower part of, the inner shell wall.

7. A vessel according to claim 5 in which the means to buoyantly support the pipe comprises a hollow float mounted on the pipe.

8. A vessel according to claim 7 in which the float is mounted in spaced relationship from the pipe by connecting means.

9. A vessel according to claim 5 in which the pipe, positioned in the inner tank and communicating at its lower end with the liquid passage, has a flexible connection at the lower end.

10. A vessel according to claim 1 having valve means operable by movement of the pipe to regulate liquid flow through the pipe and stop such liquid flow when the liquid in the annular chamber reaches a predetermined height.

11. A vessel for the storage of liquid material which comprises:
an inner shell wall,
a first outer shell wall which surrounds and is spaced outwardly from the inner shell wall,
a second outer shell wall which surrounds and is spaced outwardly from the first outer shell wall,
a bottom to which the inner, first outer and second outer shell walls are connected at their lower ends, the inner shell wall with the bottom defining an inner tank for containing liquid up to a first given maximum level,
the inner shell wall with the bottom and the outer shell wall defining a first outer tank adapted to contain liquid up to a second given maximum level which is lower than the first level,
the first outer shell wall with the bottom and the second outer shell wall defining a second outer tank adapted to contain liquid up to a third given maximum level which is lower than the second liquid level,
the inner and both outer shell walls being free to move independently of one another in response to the hydrostatic pressure of liquid in said inner and outer tanks,
a liquid passage connecting a lower space of the inner tank with a lower space of the first outer tank,
a pipe positioned in the inner tank communicating at its lower end with the liquid passage, and
means to buoyantly support and displace the pipe so that its upper end is below or at about the level of liquid in the tank so as to transfer liquid through the pipe between the inner and outer tanks when the liquid level is at or below the second given maximum level during filling or emptying of the vessel, and to support the upper end of the pipe above the liquid level in the inner tank when the liquid level in the outer tank reaches or is at the second given maximum level,
a liquid passage connecting a lower space of the first outer tank with a lower space of the second outer tank,
a second pipe positioned in the first outer tank communicating at its lower end with the liquid passage leading to the second outer tank, and
means to buoyantly support and displace the second pipe so that its upper end is below or at about the level of liquid in the first outer tank so as to transfer liquid through the pipe between the first outer tank and the second outer tank when the liquid level is at or below a maximum level in the second outer tank during filling or emptying of the vessel, and to support the upper end of the second pipe above the liquid level in the first outer tank when the liquid level in the second outer tank reaches or is at the maximum level.